Patented Jan. 31, 1928.

1,657,956

UNITED STATES PATENT OFFICE.

ANDREY CHATELAIN, OF GREENWICH, CONNECTICUT.

PROCESS FOR MANUFACTURING MOLDED CEMENT BODIES.

No Drawing.  Application filed May 22, 1926. Serial No. 111,025.

The present invention relates to a new and improved molded product including cement as a binder, and has for its object the production of a molded product which hardens rapidly and which may have at least one surface which is finished with a gloss formed during the setting of the molded product.

By the use of the process herein described the hardening of the molded product is substantially simultaneous with the setting of the cement and thus the time between the usual first and second setting is reduced substantially to zero. As a result of this last fact a great saving in time results as well as increased production. The process herein described enables one or all surfaces of the block to be hardened, and to insure hardening at the surfaces and interior, the concentration of the hardening liquids is maintained at the surfaces and the said liquids allowed to be absorbed within the interior of the block. Objects other than these will be pointed out or appear obvious in the description which follows:

The ingredients used in forming the block or other molded product, which may be of any desired shape, with or without designs produced therein, are ordinary cement, as Portland cement, white or gray, sand or broken stone or other aggregate, gylcerine, sodium or potassium silicate and water. Lime may also be added where it is desired to increase the plasticity of the mass before molding, and, when so added, is preferably added in the hydrated form.

In preparing the molded product the cement and sand are first mixed in convenient or suitable proportions, depending upon the finish required or desired, say in the proportions of one part of sand to one part of cement. However, I do not restrict myself to these particular proportions, as they are merely given for illustrative purposes and represent but one way in which my invention can be practiced. The mixture of sand and cement thus formed is worked up by admixture into the form of a mortar or paste with water containing glycerine in an amount up to about 10 percent of the water used. The use of glycerine may be deferred until the use of the sodium or potassium silicate hereafter described, or the glycerine may be used both when the mortar is formed and when the alkali silicate is used. When lime is used it is mixed with the sand and cement at the stage of forming the mortar above described.

After the mortar above described has been prepared it is placed into a suitably shaped mold one surface at least of which has a gloss imparting surface, such as glass, enamel, glazed or glossy material. The use of such a surface produces a finished or glossy surface upon the molded article. Either before or after the sides of the mold have been removed, and preferably when the molded blocks or shapes are resting upon the glass, enamel or glazed surface, the blocks or shapes while they are still wet and before setting are treated with a concentrated water solution of a silicate of an alkali metal, such as sodium or potassium silicate, prepared for example by dissolving 10 to 25 pounds of the silicate in 5 to 10 gallons of water. To this solution glycerine may also be added in an amount from 1 to 50 per cent. The silicate solution is poured, sprayed or painted over the exposed surface of the molded product and may be allowed to run down over the sides of the molded mass upon the glass or like surface or may be spread around the glass or like surface adjacent to and contacting with the lines of intersection of the molded product and the glass or other surface.

The use of the silicate solution as indicated above causes the initial setting and hardening to take place substantially simultaneously. The glycerine aids the hardening and facilitates the removal of the hardened molded shape from the glass or other surface. The silicate solution either alone or in combination with glycerine being applied to the mass before the initial set is absorbed thereby and forms silicates of calcium both within and upon the surface of the block or other molded shape. In the manner in which the soluble silicate is applied to the molded body it is so penetrating that it even passes under the molded shape and follows the glass plate or like, saturating the mortar in contact with the latter, and thereby hardening and rendering glossy with a silicate the surface of the molded shape or body in contact with the glass or like surface.

The penetrative action of the silicate solution may be assisted by forming holes within the shaped molded body and filling said holes with the silicate solution. In cases where the presence of holes would be of no objection or would be concealed, the holes may penetrate the molded mass as far down as the glass plate. The holes then would serve as centers from which the silicate solution would be distributed between the molded mass and the glass or other surface.

Any design or color effect may be obtained by mixing color pigments with the mortar; or the plates of glass, enamel, glazed or glossy surfaces may be coated or otherwise covered wholly or partially with colored mortar, or broken stone or mineral or other construction material and the bulk of the mortar, prepared as described above, poured or placed thereupon. A coating of silicate solution may be applied to the gloss imparting surface before bringing the mortar in contact therewith.

Having described my invention what I claim and desire to secure by Letters Patent is:

1. A process for manufacturing a molded cement body which comprises forming a mixture including cement, sand, water and glycerine, forming said mixture into shapes upon a gloss imparting surface and thereafter treating the surface of said formed shape before setting thereof with a solution containing sodium silicate and glycerine.

2. A process for manufacturing a molded cement body which comprises forming a mortar including cement and an aggregate, forming said mortar into shapes in contact with a gloss inparting surface and thereafter treating the surface of said formed shape before setting thereof with a solution containing a silicate of an alkali metal and glycerine.

In testimony whereof I affix my signature.

ANDREY CHATELAIN.